(12) United States Patent
Simpson (10) Patent No.: US 9,140,519 B2
(45) Date of Patent: Sep. 22, 2015

(54) LIGHT WEIGHT STIFFENED GUN STOCK

(71) Applicant: Craig B. Simpson, Mapleton, UT (US)

(72) Inventor: Craig B. Simpson, Mapleton, UT (US)

(*) Notice: Subject to any disclaimer, the term of this patent is extended or adjusted under 35 U.S.C. 154(b) by 0 days.

(21) Appl. No.: 14/221,181

(22) Filed: Mar. 20, 2014

(65) Prior Publication Data

US 2014/0190057 A1 Jul. 10, 2014

Related U.S. Application Data

(63) Continuation of application No. 13/324,745, filed on Dec. 13, 2011, now Pat. No. 8,713,837.

(60) Provisional application No. 61/422,797, filed on Dec. 14, 2010.

(51) Int. Cl.
*F41C 23/20* (2006.01)
*F41C 23/06* (2006.01)
*F41C 23/22* (2006.01)
*F41C 23/16* (2006.01)
*F41C 23/18* (2006.01)
*B29C 45/00* (2006.01)

(52) U.S. Cl.
CPC .............. *F41C 23/06* (2013.01); *B29C 45/00* (2013.01); *F41C 23/16* (2013.01); *F41C 23/18* (2013.01); *F41C 23/20* (2013.01); *F41C 23/22* (2013.01)

(58) Field of Classification Search
CPC .......... F41C 23/18; F41C 23/06; F41C 23/16; F41C 23/00; F41C 23/20; B29C 45/00
USPC .................................................. 42/71.01, 74
See application file for complete search history.

(56) References Cited

U.S. PATENT DOCUMENTS

| | | | |
|---|---|---|---|
| 2,484,168 A | 7/1946 | Jachimiec | |
| 5,615,508 A | 4/1997 | Miller et al. | |
| 6,012,246 A * | 1/2000 | Robinson et al. | 42/71.01 |
| 6,427,372 B1 | 8/2002 | Howard et al. | |
| 6,834,455 B2 | 12/2004 | Burigana | |
| 7,726,060 B1 * | 6/2010 | Jones | 42/75.02 |
| 7,743,544 B2 | 6/2010 | Laney et al. | |
| 8,028,458 B2 | 10/2011 | Rohrauer | |
| 2003/0140541 A1 | 7/2003 | Kay | |
| 2004/0226211 A1 * | 11/2004 | Keeney et al. | 42/71.01 |
| 2008/0244951 A1 * | 10/2008 | Picard et al. | 42/71.01 |

FOREIGN PATENT DOCUMENTS

| | | | | |
|---|---|---|---|---|
| AT | 502 344 A1 | * | 3/2007 | |
| FR | 979.843 | * | 5/1951 | |
| GB | 475080 | * | 11/1937 | |

* cited by examiner

*Primary Examiner* — Stephen M Johnson
(74) *Attorney, Agent, or Firm* — David R. Conklin; Kirton McConkie (57) ABSTRACT

A light weight stiffened gun stock is disclosed herein. The gun stock utilizes structural members oriented in a grid pattern resulting in a high strength-to-weight ratio. The grid pattern can be an isogrid, orthogrid, hoop-grid pattern, or a combination thereof. The structural members define the form of the gunstock, and provide recoil absorption to reduce the amount of recoil experienced by the shooter.

20 Claims, 6 Drawing Sheets

FIG. 3b

LIGHT WEIGHT STIFFENED GUN STOCK

RELATED APPLICATIONS

This application is a continuation of U.S. Non-Provisional application Ser. No. 13/324,745 filed on Dec. 13, 2011, now U.S. Pat. No. 8,713,837, and titled LIGHT WEIGHT STIFFENED GUN STOCK, which claims priority to U.S. Provisional Patent Application Ser. No. 61/422,797 filed on Dec. 14, 2010, and titled LIGHT WEIGHT STIFFENED GUN STOCK, each of which is incorporated herein in their entireties.

BACKGROUND OF THE INVENTION

1. Field of the Invention

The present invention relates generally to a light-weight grid-stiffened gun stock which could be made from non-metallic materials and, more particularly, a method to significantly reduce the weight of the gun stock while maintaining the structural integrity and providing a reduction in recoil to the shooter.

2. Technical Background

Advanced composite materials have presented a promising alternative to metals. Advanced composite materials have the advantage of being very lightweight and having a high strength. Composite materials may also be formed into any number of different shapes, depending upon the application. Because of these advantages, composite materials are being employed in many different fields, including gun stocks. The less a gun stock weighs, the longer it can be aimed and carried before the shooter experiences fatigue in a degree to affect the shooter's aim. Furthermore, the less a gun stock weighs, the less force is required for the shooter to adjust the position of the weapon, which is a significant aiming factor when small adjustments to the weapon are required.

There have been many improvements over the years with the development of light-weight composite materials and their use in composite gun stocks. These materials include fiberglass, carbon fibers, foams and a variety of woods and synthetic materials. The use of these materials can reduce the weight and increase the performance of the weapon. Conventional fabrication methods like hand lay-up, injection and compression molding are used by many manufacturers.

However, composite materials also have some disadvantages. Composite materials can be several times more expensive than metals or fiberglass. Despite the desirable strength and weight characteristics of composite materials, the price of the composite materials can often be cost prohibitive. Additionally, forming composite materials into a desired structure can require complex assembly equipment and multiple manufacturing procedures.

Therefore, there is a need in the art for a light-weight stiffened gun stock that has a strength-to-weight ratio high enough to allow the gun stock to maintain the required stiffness while also providing a reduction in weight. Thus, there is a need in the art for an inexpensive gun stock formed from composite materials. There is a further need in the art for a light-weight stiffened gun stock having hollow portions that allow the shooter to access the hollow portions for storing various items. There is yet a further need in the art to provide these benefits in a cost efficient manner. Such a gun stock is disclosed and claimed herein.

BRIEF SUMMARY OF THE INVENTION

The apparatus of the present invention has been developed in response to the present state-of-the-art, and, in particular, in response to problems, shortcomings, and needs in the art that have not yet been fully resolved by currently available gun stock designs. Thus, it is an overall objective of the present invention to provide a light weight gunstock with an improved recoil-absorbing design.

The apparatus of the present invention comprises structural members oriented substantially in a grid pattern. The grid pattern can be an isogrid pattern, an orthogrid pattern, or a pattern having a combination of both isogrid and orthogrid portions. The gun stock may be composed of at least two or more sections, each section having structural members oriented in an isogrid, orthogrid, or combination of isogrid and orthogrid patterns. The sections may be joinable in a manner to create a unitary gun stock structure.

The structural members may be formed from non-metallic composite materials, such as carbon fiber. The composite materials may be injection molded, compression molded, or custom molded to create the structural members. The structural members may also be formed from other materials, such as wood, plastic, metal, or ceramics. The structural members may be formed by taking a blank of material in the form and shape of the desired gun stock, and removing material therefrom by a machining process to create the structural members, leaving hollow areas between the structural members.

The gun stock may also comprise a fore-end and a butt, wherein the butt is designed to rest against the shoulder of the shooter. The gun stock may be designed to have an interior hollow space to further reduce the weight of the gun stock and to also provide a section where the user of the apparatus may store various objects. The interior hollow space may be at least partially located at the butt of the gun stock, and the butt may have a removable end section whereby the user of the apparatus may remove the end section to access the interior hollow area to store various items.

The gun stock may also comprise a shell disposed over the structural members and forming the outer surface of the gun stock. The shell may have an outer surface and an inner surface, wherein the inner surface is joined to the structural members. The shell and structural members may be joined by adhesives, fasteners, or by a co-curing process.

BRIEF DESCRIPTION OF THE DRAWINGS

In order that the manner in which the advantages and features of the invention are obtained, a more detailed description of the invention summarized above will be rendered by reference to the appended drawings. Understanding that these drawings only provide selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1a-3b, wherein like reference numbers indicate identical or functionally similar elements. The present invention, as generally described and illustrated in the Figures, may have a wide variety of configurations. Thus, the following more detailed description of the embodiments of the apparatus of the present invention, as represented in the Figures, is not intended to limit the scope of the invention as claimed, but is merely representative of the presently preferred embodiments of the invention.

One aspect of the present invention includes forming a gun stock 100 by removing material in certain areas of the gun stock 100 to form a grid-like structure. The design includes load carrying structural members 106 which provide adequate stiffness to the gun stock 100 in addition to softening the recoil forces exerted on the shooter by the butt 110 of the gun stock 100. The forces are transferred to the shoulder of the shooter and can affect the accuracy and trajectory of the bullet.

Another aspect of the invention resides in forming interior hollow areas within certain regions of the gun stock. The method may include a variety of different structural cross sections to maximize the strength and reduce the weight of the gun stock. The method further includes design parameters to reduce the weight and maximum the amount of recoil absorption.

Figure 1A:
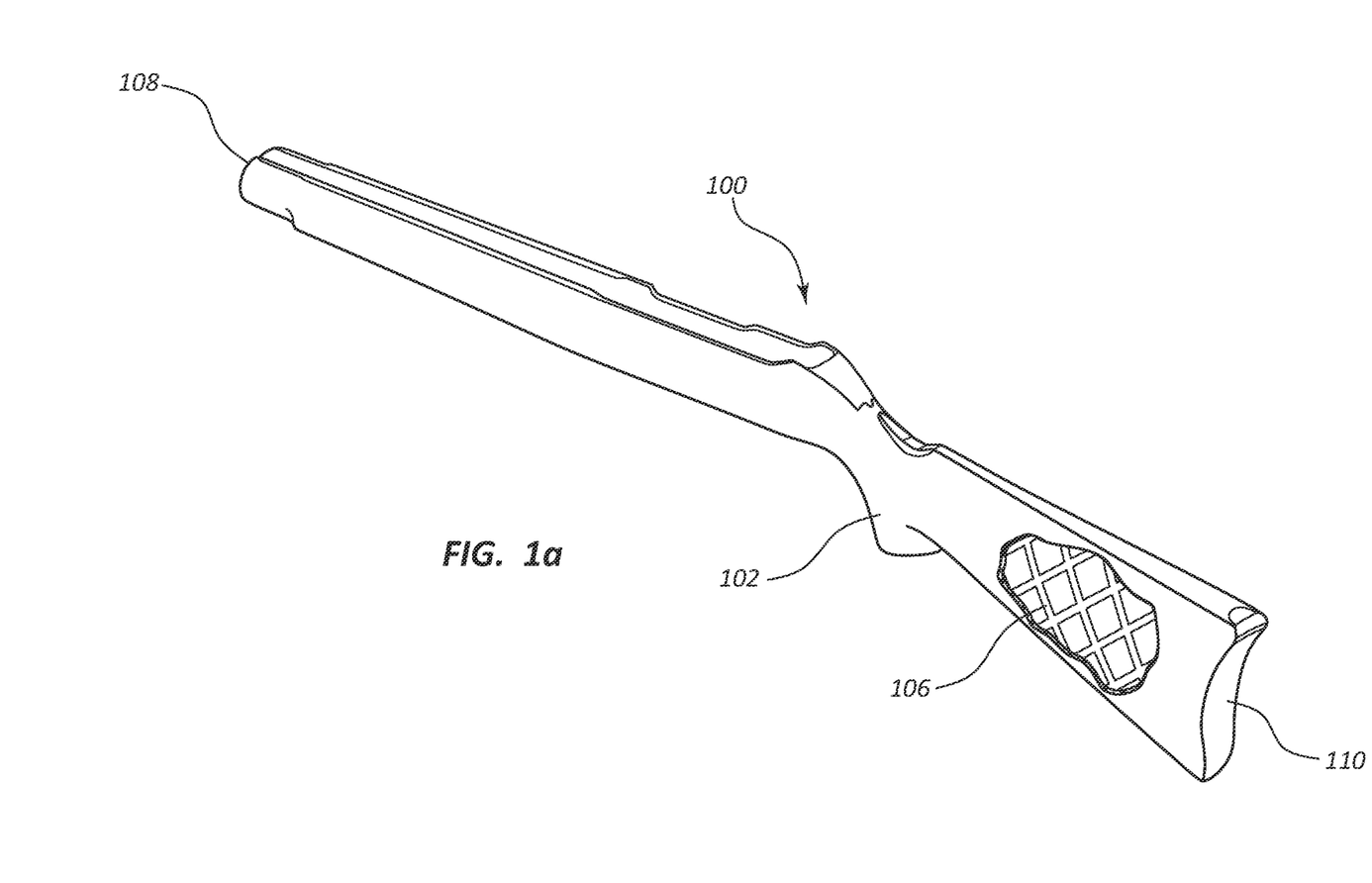
FIG. 1a is a perspective view of a light-weight stiffened gun stock with a cut-out portion showing structural members.
Figure 1B:
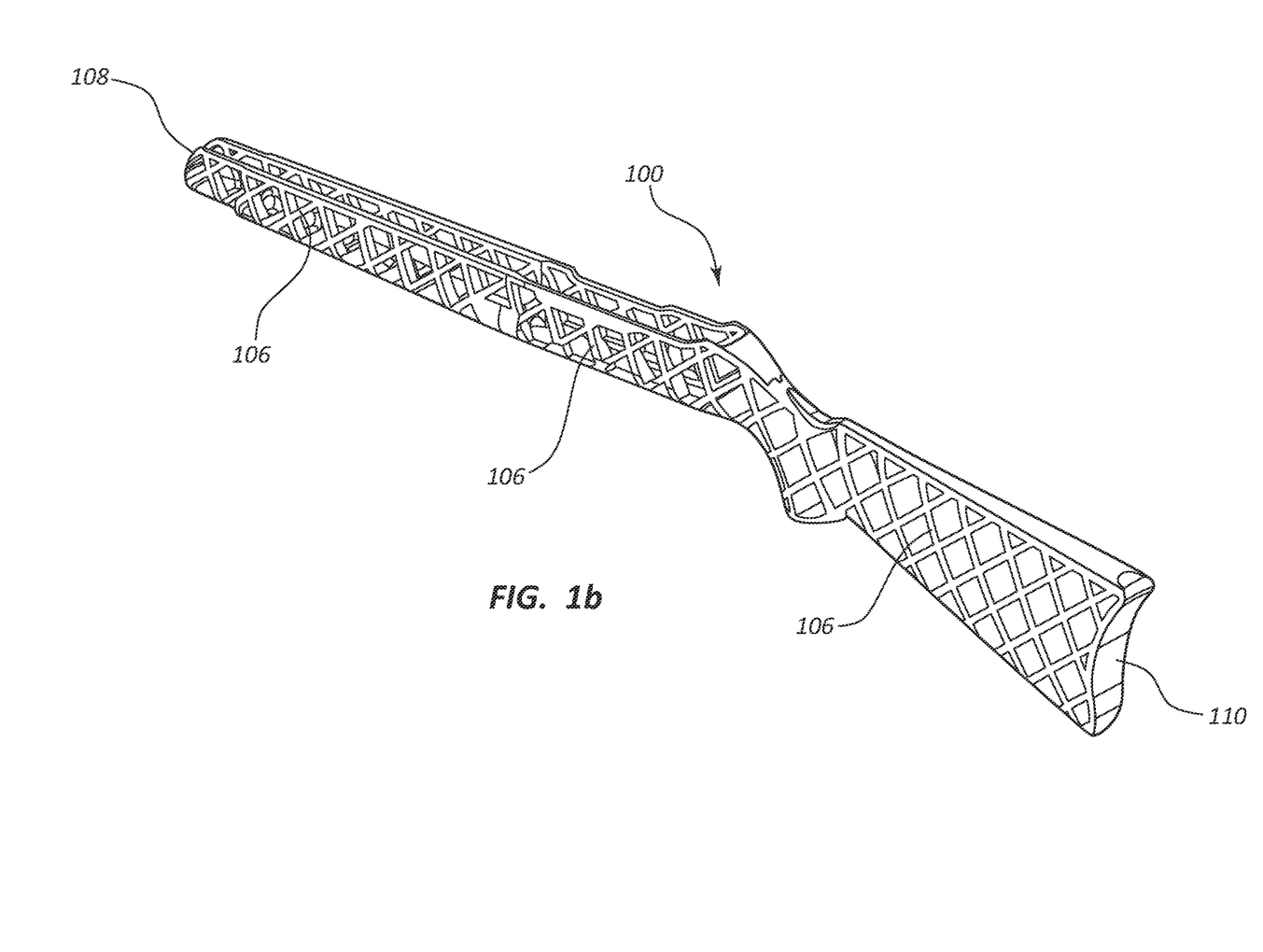
FIG. 1b is a perspective view of the structural members forming a light-weight stiffened gun stock.

A perspective view of a light-weight stiffened gun stock is illustrated in FIGS. 1a-1b. FIG. 1a illustrates a gun stock 100 with a shell 102 disposed over structural members 106. The gun stock has a fore-end 108 and a butt 110. The butt 110 may be shaped to rest comfortably against the shoulder of the shooter thus stabilizing the weapon while the shooter aims and fires the weapon. FIG. 1b illustrated a gun stock frame defined by the structural members 106. The structural members 106 may be formed in a grid pattern to provide the required stiffness to maintain the structural integrity of the gun stock 100. The grid pattern allows the stock to contain less material than conventional gun stocks thus reducing the overall weight of the gun stock 100. The grid pattern may be that of an isogrid pattern, an orthogrid pattern, or various other patterns, including hoop-grid patterns or a combination of various patterns. FIG. 1b illustrates the structural members 106 oriented in an orthogrid pattern, but other patterns and orientations are contemplated to be within the scope of the invention. The grid pattern is also configured to allow the structural members 106 to absorb a portion of the recoil force experienced when the gun is fired, thereby reducing the recoil force exerted on the shooter.

Figure 2A:
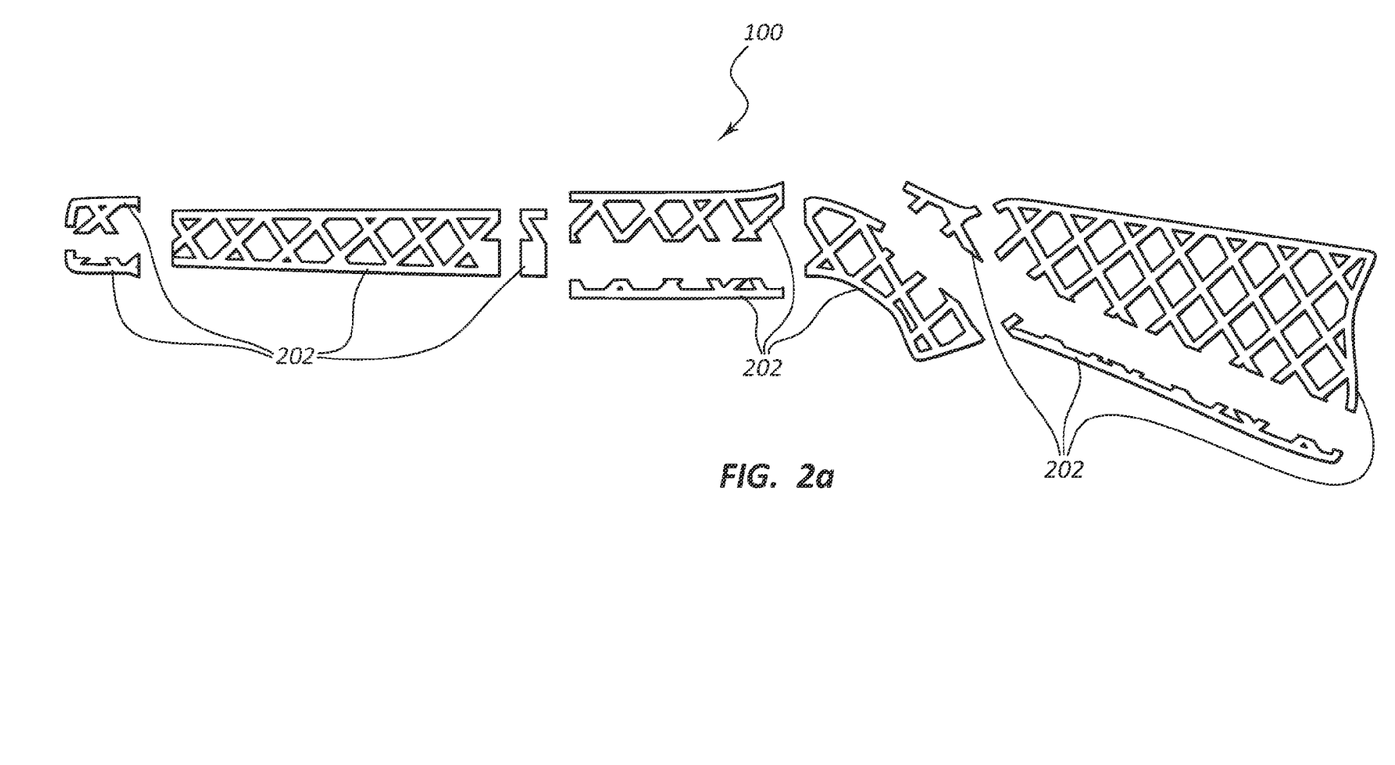
FIG. 2a is an exploded assembly view of joinable stock portions of a light-weight stiffened gun stock.
Figure 2B:
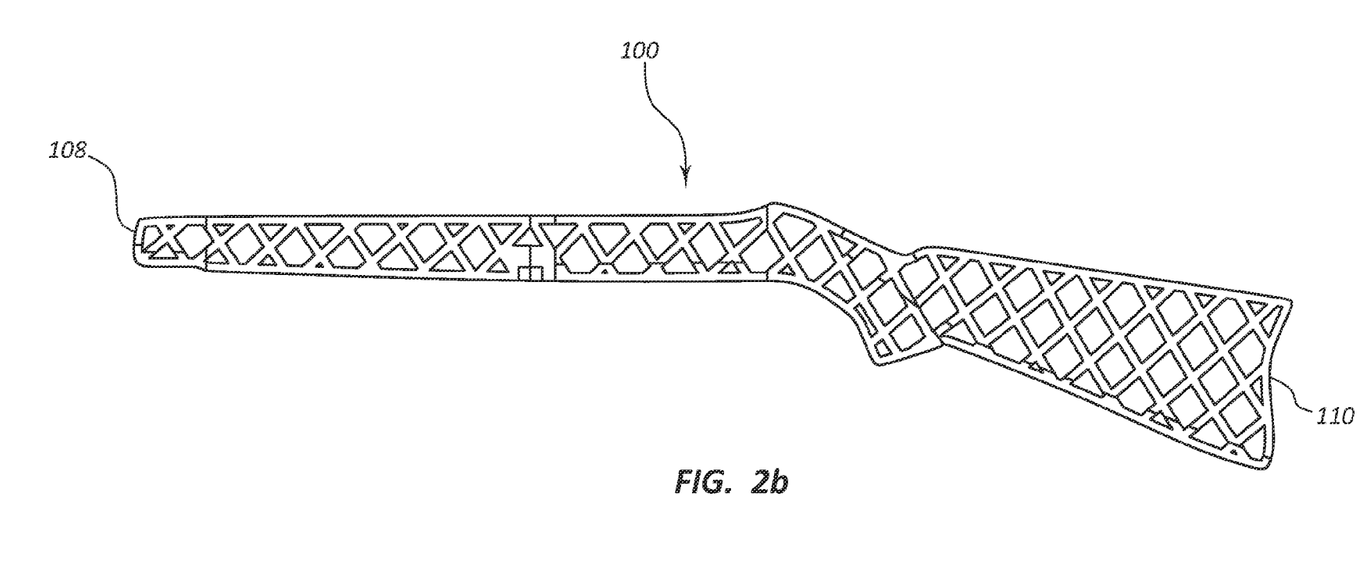
FIG. 2b is a side view of a gun stock comprising joinable stock portions having structural members in a grid pattern.

The structural members 106 may be formed from wood, plastic, metal, ceramic, or non-metallic composite materials, such as carbon fiber. The structural members 106 may be formed by machining processes or other forming or molding processes. In one embodiment, the structural members 106 are formed as a single grid forming a unitary gun stock 100. In other embodiments, the gun stock comprises two or more joinable stock portions 202 attached together forming the gun stock 100. FIGS. 2a-2b illustrates joinable stock portions each comprising structural members 106 oriented in a grid pattern. The joinable stock portions 202 can be formed separately through the same process or through different processes, and can be joined in a variety of ways, as will be discussed below.

In one embodiment, the structural members 106 may be formed by taking a blank of material in the form and shape of a single piece gun stock and removing material therefrom by a machining process to create the structural members 106 oriented in a grid-like pattern. In other embodiments, the structural members 106 may be formed in separate joinable stock portions 202 wherein the structural members may be formed by removing material from the separate joinable stock portions 202 b a machining process to create the structural members oriented in a grid-like pattern.

FIG. 2a illustrates the separate joinable stock portions. FIG. 2b illustrates a gun stock formed from connecting joinable stock portions into a single structure. In one embodiment, the joinable stock portions 202 may be separately formed by an injection molding process, and later joined in a co-curing process or through other means, such as by using adhesives, fasteners, or by joining mating components of the corresponding joinable stock portions 202. In another embodiment, the joinable stock portions 202 may be separately formed through a compression molding process, and joined in a co-curing process or through other means, such as by using adhesives, fasteners, or by joining mating components of the corresponding joinable stock portions 202.

In other embodiments, the structural members 106 may be formed through various custom molding processes. In one such embodiment, the structural members 106 may be formed by a method comprising providing a plurality of forms and a frame. A form may have a core material surrounded by a membrane, where selective forms are pressurizable. The frame is a generally rigid structure with at least one shaping surface. The forms and the frames cooperate to define a composite structure, where the composite structure is maintained in a desired shape while being cured.

Sections of composite material, such as carbon fiber, may be positioned between selective forms and at least on sheet of composite material is placed around the forms to create an exterior of a composite structure. The composite material and the forms are then enclosed in the frame. Selective forms may then be pressurized to bias the composite material against adjacent forms and against the shaping surface.

The forms may be comprised of a core material and a membrane. The core material is inserted into the membrane and the membrane is sealed to allow the pressurization of the form. The core material is configured to be structurally stable at a first temperature and removable at a second temperature. A gas source may be fluidly coupled to the form in order to pressurize the form. In one embodiment, the form is pressurized by a pipe located in the core material and extending through the membrane. Alternatively, a gas generant may be located within the form.

The composite material may be adhered to the shaping surface by first placing a composite material on the shaping surface. This can be accomplished by hand lay-up or other methods. A vacuum layer and several intermediate layers may be placed on the composite material and the air underneath a vacuum layer evacuated. The evacuation of the air will cause the atmospheric pressure to place a force on the composite material in order to adhere the composite material to the shaping surface.

The composite material may be pre-impregnated with a resin, where the composite material is slightly tacky, to allow adhesion to the shaping surfaces and the forms. Furthermore, the composite material may be cured at a plurality of temperatures and the pressurizable forms may be inflated at a plurality of pressures.

In some embodiments, the present invention may also include a single piece co-cured gun stock. The gun stock 100 may be comprised of a composite shell 102 and composite structural members 106 co-cured to form a single piece composite gun stock 100. In some embodiments, structural members 106 located at the fore-end are arcuate. The gun stock 100 may comprise a shell 102 having an outer surface 103 and an inner surface 104, wherein the structural members are stiffeners 302 located on the inner surface 104 of the shell 102. The stiffeners 302 also may be co-cured to the shell 102.

The stiffeners 302 may be oriented in various patterns, such as an isogrid, orthogrid, or hoop-grid pattern, or a combination thereof. In some embodiments, stiffeners 302 located at opposite sides of the outer surface of butt 110 are parallel to each other.

The single piece co-cured gun stock 100 may be manufactured in a process similar to that described above. A core material covered by a membrane may be used to create a generally gun stock shaped pressurizable form. The form may then be covered by a plurality of caul sheets or an inter mold surface that define the interior surface of the gun stock. The caul sheets or inter mold surface are generally rigid shaping members having various contours and channels. In one embodiment, the caul sheets or inter mold surfaces have a plurality of channels to define stiffeners 302 located on the interior of the gun stock 100. Then, composite material is placed in the channels and around the caul sheets or inter mold surfaces. The composite material is next placed in a frame to define the exterior surface of the gun stock 100. The composite material is finally cured and the form and the caul sheets or inter mold surfaces are removed.

In other embodiments, the gun stock 100 may comprise a first lateral shell surface and an opposing lateral shell surface, wherein the first lateral shell surface and the opposing lateral shell surface are substantially symmetrical and together form the overall shape of the gun stock 100. The first lateral shell surface and the opposing lateral shell surface may be comprised of two separate sheets of composite material, or alternatively the two shell surfaces may be comprised of a single sheet of composite material. Other embodiments may use multiple sheets of composite material in order to form the shell surfaces. The various sheets of composite material for the shell surfaces may have selected intersection points, such as a position along the center-line running along the length of the gun stock and located at the top and bottom of the gun stock.

The single piece co-cured gun stock may be manufactured through various methods. In one method, the composite gun stock may be made by first, laying a piece of composite material on a first clamshell frame for the first lateral shell surface. Then, a plurality of pressurizable forms may be aligned to define the structural members 106 of the gun stock, where the composite material is selectively positioned between the pressurizable forms. Next, the composite material for the opposing lateral shell surface is placed over the pressurizable forms and the composite material for the first lateral shell surface. Once the composite materials and pressurizable forms are configured, a second clamshell frame is placed over the composite material for the opposing lateral shell surface, and the clamshell frames are closed and the composite material is cured.

In one embodiment of the process, the pressurizable forms may be pressurized while the composite material is cured. The pressurization of the forms forces the composite material into a specific shape defined by the clamshell frames and forms. Additionally, the pressurizable forms may have a core material surrounded by a membrane. The core materials may also shrink during curing, such that the core materials may be easily removed and a membrane peeled from within the gun stock.

Figure 3A:
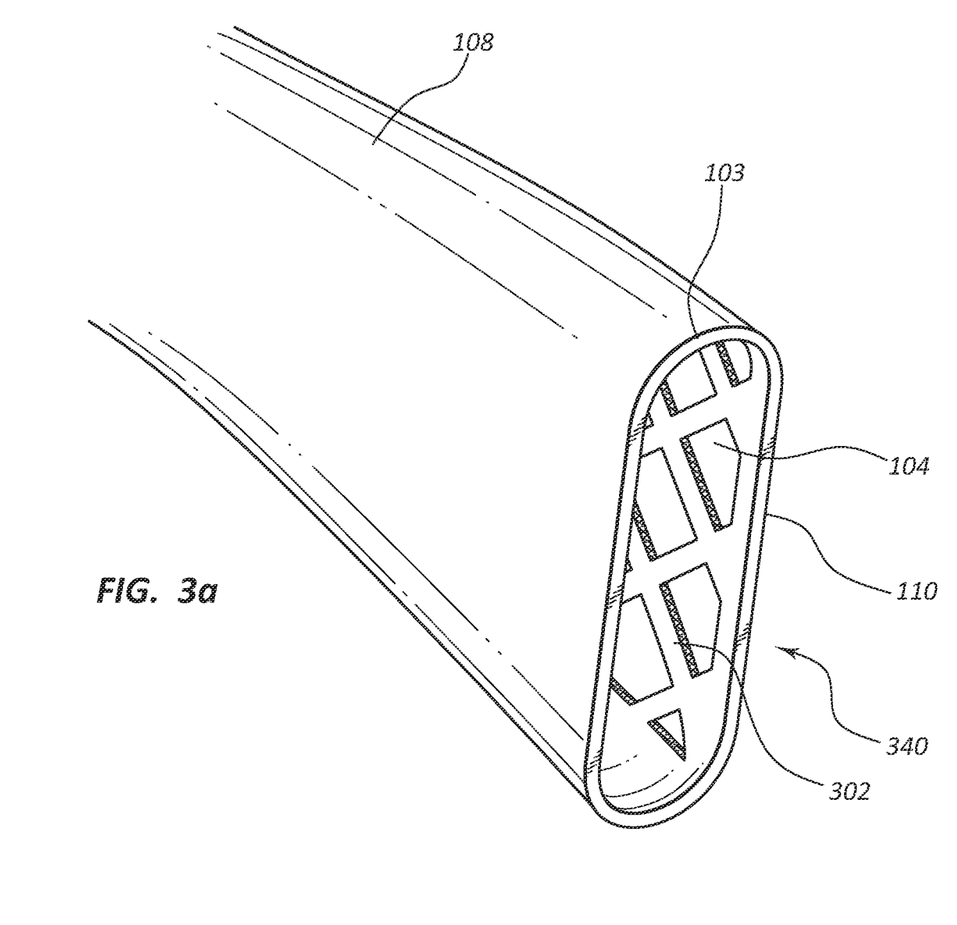
FIG. 3a is a perspective view of a butt of the light-weight stiffened gun stock.
Figure 3B:
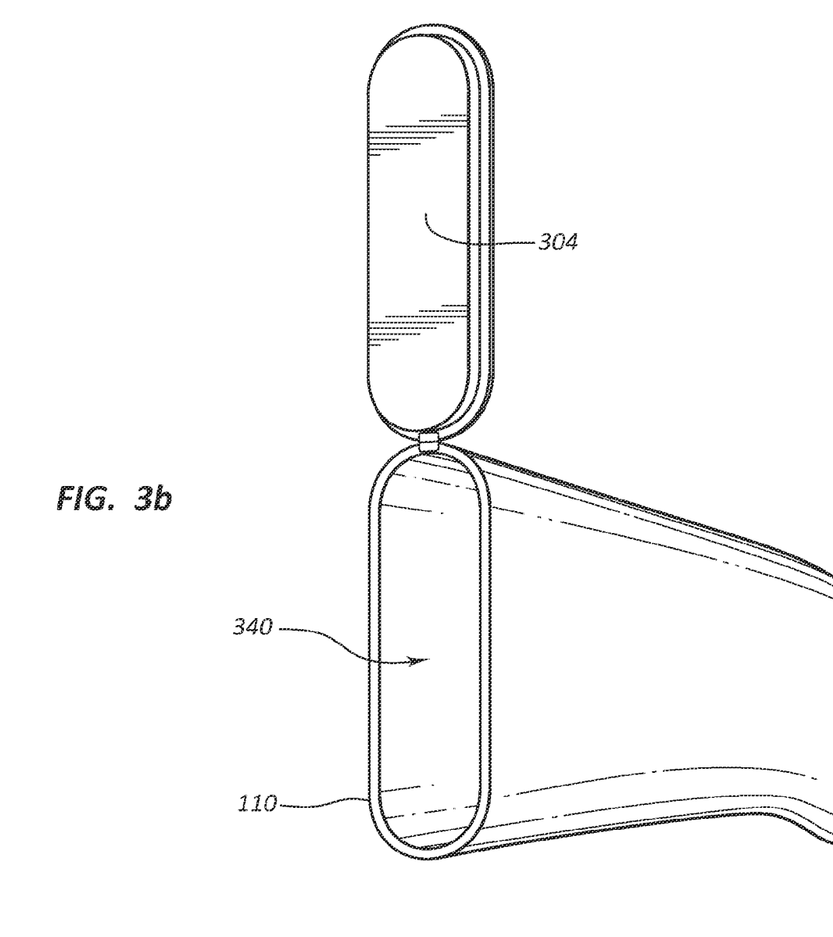
FIG. 3b is a perspective view of the butt of the light weight stiffened gun stock showing the removable end piece.

Referring now to FIG. 3a, a butt 110 of a gun stock is illustrated wherein the structural members 106 define an interior hollow section 340 located at least partially in the butt 110 of the gun stock 100. The interior hollow section 340 may be formed by removing material from the gun stock 100 by a machining process. In other embodiments, the interior hollow space may be defined by the gun stock 100 comprising a shell 102 having an outer surface 103 and an inner surface 104, where the structural members are stiffeners 302 located on the inner surface 104 of the shell 102. The stiffeners 302 may be co-cured to the shell 102. The stiffeners 302 may be oriented in various patterns, such as an isogrid, orthogrid, or hoop-grid pattern, or a combination thereof. In such embodiments, the interior hollow section 340 is defined by the stiffeners 302 disposed around the circumference of the gun stock 100 thus defining the interior hollow section 340. The interior hollow section 340 reduces the weight of the gun stock 100, and in some embodiments may be used as a space to store various items. FIG. 3b illustrates the butt 110 having a removable end piece 304 whereby the shooter may remove the end piece 304 and access the interior hollow section 340. The type of removable end piece utilized and the manner of opening the removable end piece 304 can be accomplished through a variety of pieces and manners, each of which is contemplated to be within the scope of the present invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A gun stock comprising an outer surface having sidewalls, a butt, a fore-end, and a plurality of structural members disposed between the butt and the fore-end in a grid pattern and comprising a plurality of voids that contain no structural members, said plurality of voids being located between the structural members and forming a plurality of openings, wherein the structural members located at opposite sides of the outer surface of the butt are parallel to each other, and the structural members located at the fore-end are arcuate.

2. The gun stock of claim 1, wherein said grid pattern is one of an isogrid pattern, an orthogrid pattern, a hoop-grid pattern and a combination thereof.

3. The gun stock of claim 1, wherein said gun stock comprises at least two joinable stock portions, each joinable stock portion comprising a portion of the plurality of structural members.

4. The gun stock of claim 1, wherein said structural members are a non-metallic composite material.

5. The gun stock of claim 1, wherein said structural members define a single-piece gun stock form.

6. The gun stock of claim 1 wherein the butt is configured to rest against the shoulder of the shooter and further comprises a hollow storage compartment located at least partially in said butt.

7. The gun stock of claim 6, further comprising a removable piece being configured to allow entry into said hollow storage compartment.

8. The gun stock of claim 1, wherein said structural members are formed from one of a process of injection molding, compression molding and custom molding.

9. The gun stock of claim 1, wherein said structural members are formed by removing material from said gun stock by a machining process.

10. The gun stock of claim 1, wherein said structural members are designed to absorb a portion of the recoil force when the gun is discharged.

11. The gun stock of claim 1, further comprising:

a shell disposed over the structural members, said shell having an outer exterior surface and an inner surface wherein said structural members are joined to said inner surface, wherein said structural members are stiffeners.

12. The gun stock of claim 11, wherein said shell and said stiffeners are non-metallic composite material co-cured together, forming a single-piece co-cured gun stock.

13. A method for manufacturing a gun stock, the method comprising:

providing a gun stock comprising an outer surface having sidewalls, a butt and a fore-end;

disposing a plurality of structural members in a grid pattern between the butt and the fore-end;

providing a plurality of voids having no structural members;

locating the plurality of voids between the structural members, said plurality of voids forming a plurality of openings, wherein the structural members located at opposite sides of the outer surface of the butt are parallel to each other, and the structural members located at the fore-end are arcuate.

14. The method of claim 13, further comprising a step for disposing the plurality of structural members in one of an isogrid pattern, an orthogrid pattern, a hoop-grid pattern, and a combination thereof.

15. The method of claim 13, further comprising a step for providing the gun stock in at least two joinable stock portions, each joinable stock portion comprising a portion of the plurality of structural members.

16. The method of claim 13, further comprising a step for selecting a non-metallic composite material for said plurality of structural members.

17. The method of claim 13, further comprising a step for arranging the plurality of structural members to form a single-piece gun stock form.

18. The method of claim 13, further comprising a step for providing a hollow storage compartment in the butt.

19. The method of claim 18, further comprising a step for removably coupling a cover piece to the hollow storage compartment.

20. The method of claim 13, further comprising a step for forming the structural members by at least one process selected from the group consisting of injection molding, compression molding, and custom molding.

\* \* \* \* \*